United States Patent
Bounouar et al.

(10) Patent No.: US 9,841,345 B2
(45) Date of Patent: Dec. 12, 2017

(54) DETECTION METHOD AND FACILITY FOR CHECKING SEALED PRODUCTS FOR LEAKS

(71) Applicant: ADIXEN VACUUM PRODUCTS, Annecy (FR)

(72) Inventors: Julien Bounouar, Annecy (FR); Julien Palisson, Sillingy (FR); Philippe Bunod, Serraval (FR); Sylvain Rioufrays, Le Fayet (FR); Smail Hadj-Rabah, Annecy (FR)

(73) Assignee: ADIXEN VACUUM PRODUCTS, Annecy (FR)

( * ) Notice: Subject to any disclaimer, the term of this patent is extended or adjusted under 35 U.S.C. 154(b) by 22 days.

(21) Appl. No.: 14/416,432

(22) PCT Filed: Jul. 23, 2013

(86) PCT No.: PCT/EP2013/065541
§ 371 (c)(1),
(2) Date: Jan. 22, 2015

(87) PCT Pub. No.: WO2014/016308
PCT Pub. Date: Jan. 30, 2014

(65) Prior Publication Data
US 2015/0211955 A1    Jul. 30, 2015

(30) Foreign Application Priority Data

Jul. 23, 2012   (FR) ..................................... 12 02082

(51) Int. Cl.
*G01M 3/22*    (2006.01)
*G01M 3/20*    (2006.01)
(Continued)

(52) U.S. Cl.
CPC ............. *G01M 3/223* (2013.01); *G01J 3/443* (2013.01); *G01M 3/202* (2013.01); *G01M 3/229* (2013.01); *G01M 3/38* (2013.01)

(58) Field of Classification Search
CPC ........ G01M 3/223; G01M 3/229; G01M 3/38; G01M 3/202; G01J 3/443
See application file for complete search history.

(56) References Cited

U.S. PATENT DOCUMENTS 3,824,839 A * 7/1974 Briggs .................. G01M 3/202
73/40.7
5,142,143 A * 8/1992 Fite ....................... G01M 3/202
250/281

(Continued)

FOREIGN PATENT DOCUMENTS

EP    2 042 849 A1    4/2009
JP    04-122833 A     4/1992
(Continued)

OTHER PUBLICATIONS

Translation JP 04122833 A.*
(Continued)

*Primary Examiner* — Natalie Huls
*Assistant Examiner* — Monica S Young
(74) *Attorney, Agent, or Firm* — Sughrue Mion, PLLC (57) ABSTRACT

The invention concerns a detection method for checking sealed product packages for leaks, characterized in that it comprises the following steps: at least one previously sealed product (2) is placed in an air, nitrogen, or oxygen atmosphere, in a chamber (3) (step 101), the pressure in the chamber (3) is lowered to a secondary vacuum pressure below $10^{-1}$ mbar and, while continuing the secondary vacuum pumping of the chamber (3), the gases contained in the chamber are ionized to monitor the change in the chamber (3) of the concentration of at least one gaseous (Continued)

species of the gas volume contained within the sealed product (2) chosen from among nitrogen, oxygen, or argon, by analysis by optical emission or mass spectrometry (step 102).

12 Claims, 4 Drawing Sheets

(51) Int. Cl.
*G01J 3/443* (2006.01)
*G01M 3/38* (2006.01)

(56) References Cited

U.S. PATENT DOCUMENTS

| | | | | |
|---|---|---|---|---|
| 5,523,565 | A * | 6/1996 | Federer | G01N 33/0011 250/281 |
| 5,821,537 | A * | 10/1998 | Ishihara | G01J 3/433 250/339.13 |
| 2009/0193876 | A1 * | 8/2009 | Wetrzig | G01M 3/202 73/40.7 |
| 2010/0095745 | A1 * | 4/2010 | Flynn | G01M 3/207 73/40.7 |
| 2011/0113862 | A1 * | 5/2011 | Maehira | G01M 3/229 73/40.7 |
| 2011/0315872 | A1 * | 12/2011 | Nakajima | G01N 27/66 250/283 |

FOREIGN PATENT DOCUMENTS

| | | | | |
|---|---|---|---|---|
| JP | 04122833 | A * | 4/1992 | |
| JP | 10-185752 | A | 7/1998 | |
| JP | 10-213516 | A | 8/1998 | |
| JP | 2005-055263 | A | 3/2005 | |
| JP | 2009-198431 | A | 9/2009 | |
| WO | 95/00827 | A1 | 1/1995 | |
| WO | 99/46572 | A1 | 9/1999 | |
| WO | WO 9946572 | A1 * | 9/1999 | G01M 3/229 |
| WO | WO 2009027156 | A1 * | 3/2009 | G01N 21/66 |
| WO | WO 2010106792 | A1 * | 9/2010 | G01M 3/202 |

OTHER PUBLICATIONS

A.I. Nadezhdinskii et al., "Diode laser spectroscopy: precise spectral line shape measurements", Spectrochimica Acta Part A, 1996, pp. 1041-1060, vol. 52, No. 8.

Bhaskar Mitra et al., "The Detection of Chemical Vapors in Air Using Optical Emission Spectroscopy of Pulsed Microdischarges From Two- and Three-Electrode Microstructures", IEEE Sensors Journal, Aug. 2008, pp. 1445-1454, vol. 8, No. 8.

International Search Report for PCT/EP2013/065541 dated Dec. 13, 2013.

Communication issued Apr. 18, 2017 from a Japanese Patent Office in counterpart Japanese Patent Application No. 2015-523533.

* cited by examiner

DETECTION METHOD AND FACILITY FOR CHECKING SEALED PRODUCTS FOR LEAKS

CROSS REFERENCE TO RELATED APPLICATIONS

This application is a National Stage of International Application No. PCT/EP2013/065541 filed Jul. 23, 2013, claiming priority based on French Patent Application No. 1202082 filed Jul. 23, 2012, the contents of all of which are incorporated herein by reference in their entirety.

TECHNICAL FIELD

The present invention relates to a detection method for testing the leaktightness of sealed products such as pharmaceutical or food products, or products from the biotechnology industry, motor vehicle industry or cosmetic industry. The present invention also relates to an associated detection device for the implementation of said detection method.

PRIOR ART

Certain products such as sealed blister packs, sachets, vials, pouches, and pharmaceutical or medical bags, are sealed in a packaging at atmospheric pressure or under vacuum, in order to preserve their integrity.

In order to ensure that the sealing is perfectly leaktight, the leaktightness of the sealed product is tested. The test must guarantee the sealing with a good sensitivity for various types of dry or liquid, flexible or rigid, opaque or transparent, etc. products. For the pharmaceutical and agrifood industries, this test is essential for ensuring the stability of the medicament or of the food product by protecting it from moisture, air and bacteria.

Several methods exist for testing the leaktightness of sealed products. However, these methods have certain drawbacks.

The "methylene blue" leak test method is for example known. This method consists in immersing the sealed product in a solution colored with methylene blue. A visual inspection of the sealed product makes it possible to detect a possible migration of the colored solution into the sample and therefore, to detect possible leaks in the packaging. The sensitivity of the leak detection is of the order of $10^{-2}$ mbar·l/s. This method is quick and simple to carry out but the test is destructive and the sensitivity is not sufficient.

Another known method consists in carrying out a helium test. This method requires the detection of the passage of helium through the leaks. Use is made, in this way, of the property of helium which passes through small leaks more easily than other gases, due to the small size of its molecule.

For this, the inside of the packaging is filled in a controlled manner with a helium tracer gas before the product is sealed. Next, the possible presence of the tracer gas around the sample is detected using a leak detector. The sample is either placed in a leaktight test chamber placed under vacuum, or a "sniffer" leak detector is used and the measurement in this case is carried out at atmospheric pressure. The detection must be carried out for helium concentrations that are much greater than the natural concentration of helium in the air and that are perfectly known. These methods have a very high measurement sensitivity, generally of greater than $10^{-8}$ mbar·l/s.

However, after the test, the sample cannot be replaced directly in the packaging line since it is filled with helium gas. Moreover, the use of this method is relatively complex and expensive. Furthermore, even after having purged the helium that the product contained for the test, it is necessary to wait a certain time for the sample to be decontaminated. Finally, during the detection of a defective sample having a major leak, helium escapes into the test chamber. After removal of the defective sample, it is then necessary to purge the residual helium present in the test chamber, which could distort a subsequent measurement.

Other existing methods enable the use of the sealed product that has been tested and shown to be intact. For example, a method for testing the leaktightness of sealed containers is known that is based on tunable diode laser absorption spectroscopy. A divergent laser beam is transmitted through the opposite walls of a leaktight container and is focused on a detector. The accumulation of gases such as oxygen, moisture and carbon dioxide are measured in the sample through the packaging. After a measurement of a few days (five days for monitoring oxygen), it is possible to detect, with a good sensitivity, if the amounts of gases measured are stable or are changing, an increase or a decrease in these gases possibly expressing the presence of a leak. However, the duration of the test does not make it possible to intervene rapidly on a defective production line. Moreover, it involves the use of a storage site for carrying out sensitive measurements. Furthermore, this method does not apply to liquid products.

Other measurement principles require that the packaging be flexible and consequently do not apply to all types of products. This is the case, for example, for certain optical or strain gauge measurement principles, which monitor the deformation under vacuum of the packaging. Furthermore, the sensitivity of these measurements is limited since they cannot be easily calibrated.

SUMMARY OF THE INVENTION

The known methods are therefore either destructive and the sealed products tested cannot be used; or they lack sensitivity and leaks may then exist without being detected and damage the product; or these methods are specific to a particular type of product and it is not possible to test all the products for leaks with the same measurement method; or the methods are too expensive.

In industry, the current tendency aims to make the integrity tests more severe and to systematize the latter. Depending on the various types of products and packagings, the rejection threshold may vary between $10^{-3}$ mbar·l/s and $10^{-6}$ mbar·l/s. Therefore, these industries seek a leak test method that is nondestructive and is of good sensitivity in order to be able to be used for in-line testing.

One objective of the present invention is to overcome this drawback at least partially by proposing a detection method for testing the leaktightness of sealed products that is nondestructive and which has a good measurement sensitivity.

Another objective of the present invention is that the method can be applied to various types of products, in particular dry or liquid products and all types of packagings, in particular packagings that are optically transparent or not, flexible or rigid.

To this end, one subject of the invention is a detection method for testing the leaktightness of sealed products, characterized in that it comprises the following steps:

at least one product that has been previously sealed in an air, nitrogen or argon atmosphere is placed in a chamber, the pressure in the chamber is lowered to a high vacuum pressure of less than $10^{-1}$ mbar and, while continuing the high vacuum pumping in the chamber, the gases contained in the chamber are ionized in order to monitor the evolution, in the chamber, of the concentration of at least one ionized gas species of the gas volume contained in the sealed product from among nitrogen, oxygen or argon, via analysis by optical emission spectrometry or mass spectrometry.

At low pressure, that is to say at a high vacuum pressure at least of less than $10^{-1}$ mbar, and in the absence of leaks, the air that was present in the chamber is evacuated and the residual atmosphere predominantly consists of water vapor resulting from the degassing of the walls. The gas contained in the sealed product is therefore in principle absent from the atmosphere of the chamber, the latter predominantly containing water vapor.

The detection method uses the fact that the sealed products contain a gaseous atmosphere trapped between the element to be protected and the packaging. Monitoring the evolution of the gas species contained in this gas volume and the comparison thereof with calibrated evolutions of concentration of reference gas species therefore makes it possible to identify the presence of a leak from the sealed product.

Analysis by optical emission spectrometry or mass spectrometry makes it possible to detect very small amounts of ionized gas species in real time, that is to say without a waiting time isolated from the pumping necessary for the accumulation of gas molecules to be monitored as may be the case in certain detection methods of the prior art. The time needed for the leak test is therefore reduced. This is made possible by placing under high vacuum, essential for distinguishing the ambient air and its constituents from the air contained in the sealed product.

The detection method may comprise a preliminary step of detecting major leaks, before lowering the pressure in the chamber to a high vacuum pressure, in which the evolution, in the chamber, of the concentration of at least one gas species is monitored. The expression "major leaks" defines leaks for which the flow rate is greater than $10^{-2}$ mbar·l/s.

The preliminary detection step makes it possible to prevent, in the event of major leaks, the lowering of the pressure to a high vacuum pressure from also giving rise to the pumping of all the gas contained in the cavity of the sealed product through the major leak and therefore the non-detection of the major leak. A simple, low-cost gas sensor thus makes it possible to detect a major leak from the sealed product, with a detection sensitivity such as of the order of ppmv (parts per million by volume) at atmospheric pressure or under rough vacuum.

During the preliminary step of detecting major leaks, it is possible either to leave the pressure of the chamber at ambient atmospheric pressure, or to lower the pressure to a rough vacuum pressure, of greater than 1 mbar, in order to accelerate the diffusion of the gas mixture (gas contained in the sealed product and the gas from the chamber) toward the gas sensor.

Also, in the step of detecting major leaks, it is possible to replace the atmosphere of the chamber that contains the sealed product with a purge gas in order to monitor the evolution, in the chamber, of the concentration of at least one gas species of the gas volume contained in the sealed product, different from the purge gas.

During the preliminary step of detecting major leaks and during the high-vacuum detection step, the gas species monitored may be a distinctive gas species of the air such as nitrogen or oxygen. Indeed, many sealed products, especially those from the pharmaceutical or agri-food industry, are sealed under air. Since air comprises around 78% nitrogen and 20% oxygen, these two gas species are readily identifiable in the chamber in the event of a leak from the sealed product.

Certain products are sealed under a nitrogen atmosphere in order to prevent oxidation of the element to be protected, in particular in the food industry for a sterile closure, in particular of packaging sachets. Monitoring the evolution of the nitrogen concentration makes it possible, in this case, to indicate a leak from the sealed product.

In the event of the packing leaking or bursting, the air or nitrogen from the product has the advantage of being able to be easily and rapidly evacuated from the chamber, unlike the helium from the tests of the prior art, which requires long minutes of pumping the chamber before it can be reused for a new leak test.

In the pharmaceutical industry, certain biological materials are sealed under an atmosphere comprising an inert gas, such as argon in order to prevent the deterioration of these biological materials. This is the case in particular for DNA (deoxyribonucleic acid), which risks being deteriorated once extracted from living tissues, especially by water or oxygen. Sealing under argon may also be used in the food industry, especially for preserving meat.

Sealing under argon is also used in the motor vehicle field.

Certain products may be sealed under a gas mixture, especially a mixture of argon and nitrogen, for example for fire extinguisher tanks.

In this case, the gas species to be monitored may therefore be argon.

Helium is not a gas species used as indicator of a leak from the sealed product due to the small proportion of helium in the air and therefore the tiny proportion of helium that could escape from a sealed product containing air. Also, due to its difficulty in being evacuated, helium may have a high background noise relative to the concentrations whose evolution it would be desired to monitor.

The detection method may therefore be carried out for leak testing various types of sealed products, especially dry or liquid, transparent or opaque, flexible or rigid products, as long as they contain a gas volume.

It is not therefore necessary to pierce and replug the packaging in order to fill it with tracer gas, nor to seal the product with a tracer gas as in certain processes from the prior art. No particular step is necessary between the sealing of the product in production, the leak test and the marketing of the leak-free sealed product.

The detection method is therefore nondestructive since it does not damage the packaging nor its contents, it being possible for the sealed product to be replaced directly, that is to say without specific cleaning or other treatment, in the packaging line.

Lastly, the detection method has a good measurement sensitivity, of the order of $10^{-6}$ mbar·l/s, during the high vacuum detection step.

In the case where the gas species is monitored via analysis by optical emission spectrometry, it is possible to monitor the evolution of the ratio of the intensities of a spectral line of the monitored gas species, for example a distinctive spectral line of nitrogen or oxygen to a distinctive spectral line of water vapor in the spectrum representative of the gas species present in the chamber. For example, the evolution of the ratio of the intensities of a distinctive spectral line of nitrogen to a distinctive spectral line of water vapor is monitored. Of course, the ratio of the intensities may be achieved with a species other than water vapor.

Indeed, the atmosphere of the chamber very often comprises water vapor originating from the moisture from the air that entered with the sealed product or from the degassing of the walls. The spectrum of the gas species present in the chamber therefore always contains a distinctive line of water vapor. Thus, should the optical window of the gas detector capture less light, for example due to the fouling thereof, making the signal transmitted to the treatment unit lose intensity, it is ensured that the measurement given by the ratio of the lines remains valid and representative of the evolution of the partial pressure of air. Moreover, monitoring the ratio of the intensities of a distinctive spectral line of air to a distinctive spectral line of water vapor makes it possible to standardize the intensity of the distinctive spectral line of air in order to ensure that the evolution thereof is indeed representative of the partial pressure of air.

In addition, it is possible to compare the ratio of the intensities of the spectral line of the gas species monitored such as a distinctive spectral line of air and of a distinctive spectral line of water vapor, with the intensity ratios obtained for a plurality of leaks calibrated during a drop in pressure in the chamber, in order to quantify the leak.

According to another aspect, the sealed product is cooled during the measurement. The degassing of the packaging of the sealed product at low pressure is thus limited, which makes it possible to reduce the measurement time and therefore to increase the rate of the tests.

Another subject of the invention is a detection device for testing the leaktightness of sealed products, comprising:
  a chamber configured in order to receive at least one product which has been sealed under an air, nitrogen or argon atmosphere,
  a pumping unit comprising a rough vacuum pump and a turbomolecular vacuum pump connected in series, the inlet of the turbomolecular vacuum pump being connected to the outlet of the chamber,
  an ionized gas detector comprising a gas ionization means,
  a treatment unit connected to the ionized gas detector in order to receive signals
  representative of the evolution of gas species, characterized in that the treatment unit is configured to monitor the evolution, in the chamber, of the concentration of at least one ionized gas species of the gas volume contained in the sealed product from among nitrogen, oxygen or argon, and to compare the evolution of the concentration of said ionized gas species to calibrated evolutions of reference gas species concentration in order to identify the presence of a leak from said sealed product.

The device may comprise at least one calibrated leak connected to the chamber. The calibrated leaks may be used occasionally between two measurements in order to correct a possible drift of the ionized gas detector.

According to a first aspect, the treatment unit is additionally configured in order to quantify said leak by comparison with calibration curves of the ionized gas detector obtained during a drop in pressure in the chamber for a plurality of calibrated leaks, stored in the memory of the treatment unit.

The measurement may be carried out via analysis by optical emission spectrometry and in this case the ionized gas detector comprises:
  an enclosure capable of being placed in communication with the chamber,
  an optical emission spectrometer connected to an optical window of the enclosure, and
  a plasma-generating device arranged around the enclosure, forming a gas ionization means of the ionized gas detector, capable of generating a plasma on the gas species present in the chamber.

According to another aspect, the measurement may be carried out via analysis by mass spectrometry and in this case the ionized gas detector is a mass spectrometer.

The detection device may comprise means for holding the sealed product so as to limit its deformation when placed under vacuum, in particular in the case of flexible packagings that do not have sufficient mechanical strength. These holding means advantageously comprise a cooling means in order to reduce the measurement time.

Another means of reducing the measurement time may be to limit the water vapor present in the chamber by making provision for the chamber to comprise a cold trap, such as cryogenic trap.

The detection device may also comprise a purge gas injection means capable of introducing a purge gas into the chamber during the preliminary step of detecting major leaks for testing the leaktightness of the sealed product and for returning to atmospheric pressure after the chamber has been placed under vacuum.

The detection device may also comprise a gas sensor, such as an oxygen gas sensor, in order to monitor the evolution, in the chamber, of the concentration of oxygen in the preliminary step of detecting major leaks.

BRIEF DESCRIPTION OF THE DRAWINGS

Other features and advantages of the invention will emerge from the following description, given by way of example, with no implied limitation, with regard to the appended drawings in which.

DESCRIPTION OF PREFERRED EMBODIMENTS

In the figures, identical components bear the same reference numbers. The steps of the method are numbered from 100.

Figure 1:
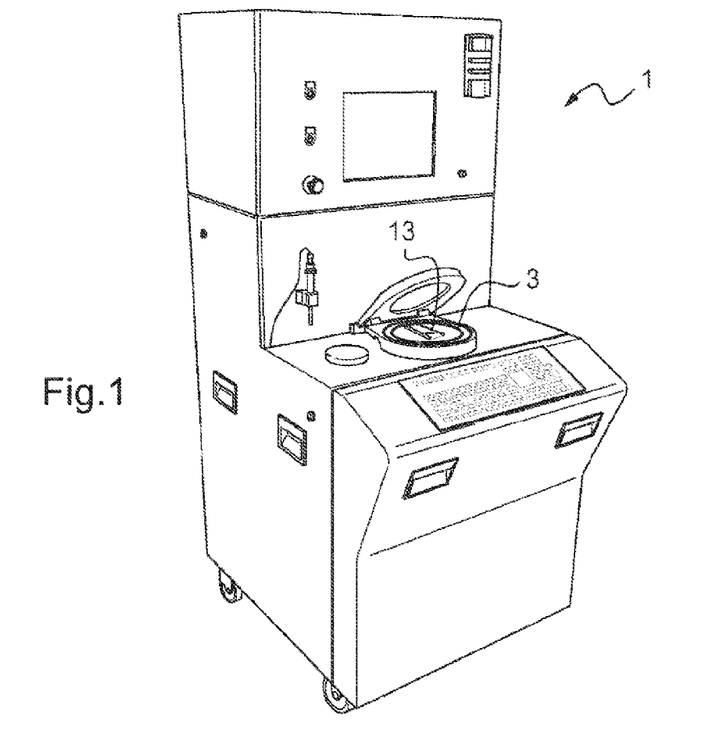
FIG. 1 represents a perspective view of a detection device for testing the leaktightness of sealed products.

FIG. 1 represents a detection device 1 for testing sealed products 2 for leaks.

The sealed products 2 are, for example, pharmaceutical or food products, such as sealed blister packs (FIG. 3), sachets, vials, pouches and pharmaceutical or medical bags. The sealed products 2 may also be products from the biotechnology industry or motor vehicle industry.

These products contain at least one element to be protected, for example from moisture, air or bacteria, such as a medicament or a foodstuff. The element to be protected may be in liquid or solid form. It is packed in a sealed packaging. Intact sealing guarantees that access to the inside of the packaging is impossible, no gas can enter or leave the packaging.

The sealed product 2 contains a gas volume, such as air, between the element to be protected and its packaging. Other examples of sealing gases in the gas volume of the sealed product 2 are given subsequently. The pressure of the gas volume contained in the sealed product 2 is therefore constant. This may be atmospheric pressure or a subatmospheric pressure for "vacuum" packs, depending on the packaging thereof.

Figure 2A:
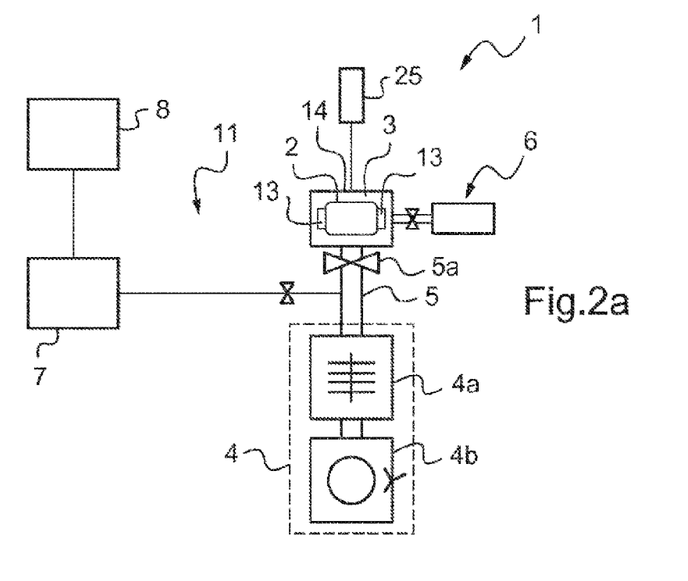
FIG. 2a shows a schematic view of components of the detection device from FIG. 1.
Figures 2B, 3, 4, 5:
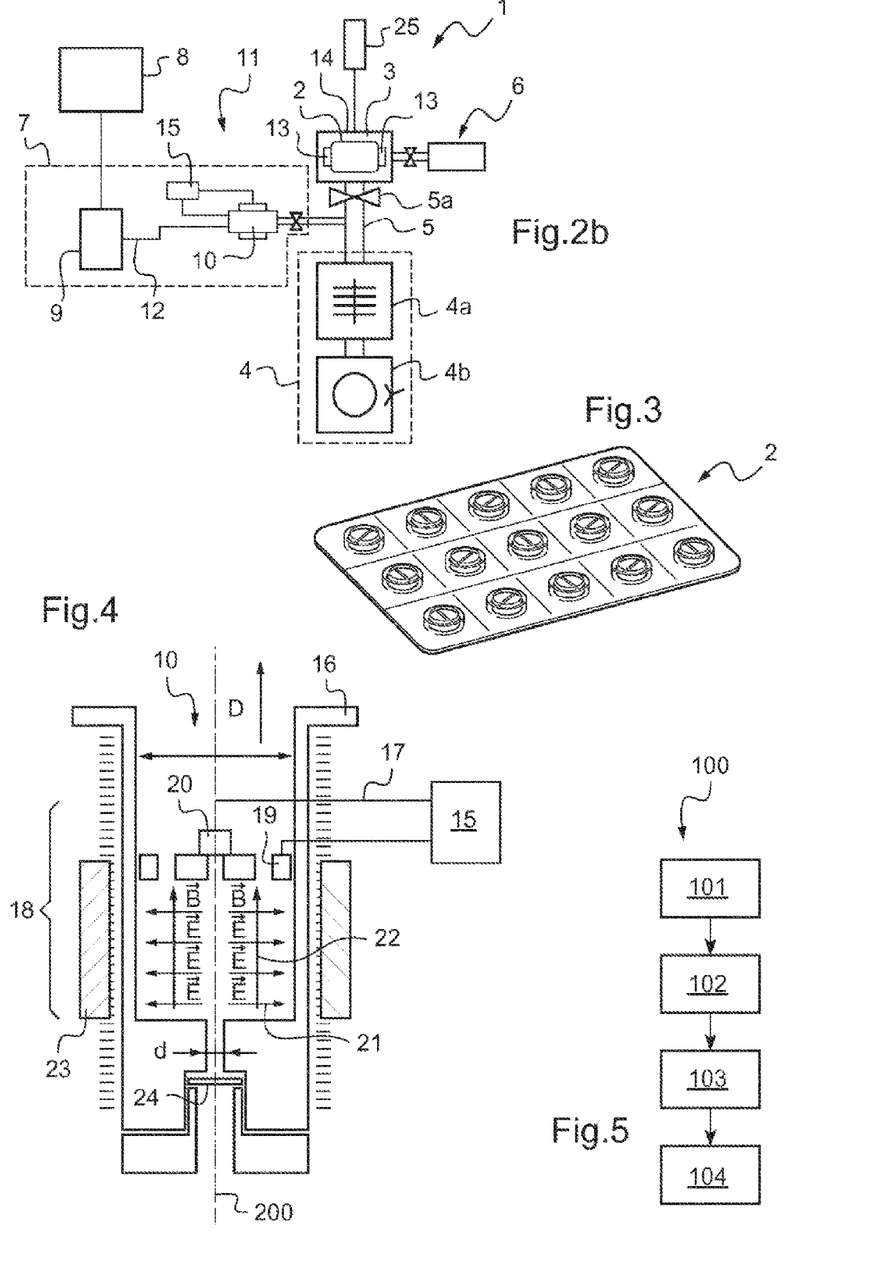
FIG. 2b shows a schematic view of components of a detection device according to a second exemplary embodiment.
FIG. 3 shows a perspective view of an example of a sealed pharmaceutical product.
FIG. 4 represents an exemplary embodiment of an ionized gas detector.
FIG. 5 represents a flow chart of a detection method for testing the leaktightness of sealed products, carried out in the detection device from FIG. 1.

As can be seen in FIG. 2a, the detection device 1 comprises a chamber 3 configured to receive at least one sealed product 2 to be tested, a pumping unit 4 fluidically connected to the chamber 3 by a line 5 via an isolation valve 5a, an ionized gas detector 7 and a gas sensor 25 fluidically connected to the chamber 3 and a treatment unit 8 connected to the ionized gas detector 7 in order to receive from the latter signals representative of the evolution of gas species.

The detection device 1 comprises a purge gas introduction means 6 capable of introducing a purge gas into the chamber 3 in order to test the leaktightness of the sealed product 2 and in order to return to atmospheric pressure after the chamber 3 has been placed under vacuum.

The device 1 may also comprise at least one calibrated leak connected to the chamber. The expression "calibrated leak" is understood to mean a leak having characteristics that are known. The calibrated leaks may be used for the preliminary calibration step or occasionally between two measurements in order to correct an optional drift of the ionized gas detector 7. In order to do this, it is possible to inject a test gas with a known flow rate in to calibrate the ionized gas detector 7. According to one exemplary embodiment, the device is connected to a distributor of the gas species that it is desired to detect, a gas cylinder for example, and to a means for controlling the flow rate of the gas species.

As can be seen in FIG. 1, the detection device 1 may also comprise a means 13 for holding the sealed product so as to limit the deformation thereof when placed under vacuum, in particular in the case of flexible packagings which do not have sufficient mechanical strength.

These holding means 13 advantageously comprise a cooling means. The cooling means comprises, for example, a water-cooled coil condenser or Peltier elements.

The cooling means makes it possible to control the temperature of the packaging of the sealed product 2 by reducing it, for example, to a temperature below 20° C., such as 10° C. It is thus possible to cool the sealed product 2 during the measurement, which limits the degassing of the packaging of the sealed product 2 at low pressure and therefore makes it possible to reduce the measurement time and therefore to increase the rate of the tests.

Another means of reducing the measurement temperature may be to limit the water vapor present in the chamber 3 by making provision for the chamber 3 to comprise a cold trap 14, such as a cryogenic trap, as shown schematically in FIG. 2a.

The chamber 3 is suitable for being able to be placed under vacuum. The pumping unit 4 comprises a rough vacuum pump 4b and a turbomolecular vacuum pump 4a, suitable for providing a high vacuum at a vacuum pressure limit in the chamber 3 of less than $10^{-1}$ mbar, such as of the order of $10^{-5}$ mbar.

The rough vacuum pump 4b and the turbomolecular vacuum pump 4a are connected in series, the inlet of the turbomolecular vacuum pump 4a being connected to the outlet of the chamber 3.

The chamber 3 has a volume which may contain one or more sealed products 2 and which has dimensions slightly greater than the volume of the sealed product or products 2 to be tested, so as to limit as much as possible the absorption of the gases by the surfaces of the chamber 3 when the latter is at atmospheric pressure for the loading/unloading of the sealed product 2. Thus the degassing of the walls of the chamber 3 at low pressure, which could increase the background noise, is limited. Furthermore, a volume just slightly greater than the volume of the sealed product 2 makes it possible to lower the pressure in the chamber 3 more rapidly and therefore to improve the response time and the measurement sensitivity, the measurement volume being equal to the volume of the chamber 3 from which the volume of the sealed product 2 has been subtracted.

The gas sensor 25 is, for example, an oxygen sensor, for example based on technology based on zirconium dioxide, capable of measuring oxygen concentrations with a detection sensitivity of the order of ppmv at atmospheric pressure or under a rough vacuum. This gas sensor is simple, low cost and enables the detection of a major leak from the sealed product 2.

In practice, the ionized gas detector 7 may be connected to the line 5 connecting the pumping unit 4 to the chamber 3, so as to remain under low pressure during the loading and unloading of the sealed product 2 in the chamber 3 at atmospheric pressure.

According to a first exemplary embodiment represented in FIG. 2a, the ionized gas detector 7 is a mass spectrometer configured in order to measure the evolution of the concentration of at least one gas species in the chamber 3.

The mass spectrometer comprises an ionization source, at least one analyzer and one acquisition means.

The ionization source is configured in order to ionize the gas to be measured from the chamber 3, forming the gas ionization means of the ionized gas detector 7.

The analyzer separates the ions generated according to their m/z ratio where m represents the mass and z the valence (or m/q, q representing the charge). The analyzer is for example a quadripolar analyzer comprising a quadripole (or quadrupole) formed from four parallel electrodes of hyperbolic or cylindrical cross section.

The acquisition means count the ions and amplify the signal. A mass spectrum is thus obtained that represents the m/z ratios of the ions detected as a function of the relative abundance of these ions.

According to another exemplary embodiment represented in FIGS. 2b and 4, the ionized gas detector 7 comprises an optical emission spectrometer 9, an enclosure 10 capable of being placed in fluidic communication with the chamber 3 and a plasma-generating device 11. The plasma-generating device 11 is configured in order to ionize the gas to be measured from the chamber 3 in the enclosure 10, forming the gas ionization means of the ionized gas detector 7.

In optical emission spectrometry, the charged molecules (ions) are separated as a function of the wavelength at which they emit. The amplitude of a peak from the spectrum (or spectral line) corresponds to the relative abundance of a molecule fragment.

According to one exemplary embodiment, the plasma-generating device 11 comprises a plasma source and a direct current generator 15.

Seen better in FIG. 4, the cylindrical enclosure 10 is delimited by walls 16 made of a vacuum-resistant conductive material, such as for example stainless steel. The enclosure 10 is connected to the line 5 via its open end. Thus, the cylindrical enclosure 10 may be placed under vacuum owing to the pumping unit 4 connected to the chamber 3, which is itself under vacuum. A plasma is generated inside this enclosure 10 in order to make it possible to analyze the gas species present in the chamber 3.

The plasma source is formed of an anode 17 (+ pole) and of a cathode 18 (− pole) respectively connected to the positive and negative poles of DC voltage generator 15. The cathode 18 comprises the walls 16 that delimit the cylindrical enclosure 10 and a perforated disk 19. The anode 17 of wire type is placed in the center of the cathode 18, from which it is insulated by a support 20 made of dielectric material having a low degassing rate, such as, for example, a ceramic, placed on the surface of the disk 19 of the cathode 18.

The generator 15 applies, between the anode 17 (positively charged) and the cathode 18 (negatively charged) a high potential difference, of the order of 3000 volts, which generates an intense electric field E 21 of transverse direction with respect to the axis 200 of the plasma source. This field 21 makes it possible to create a plasma by generation and acceleration of a stream of electrons from the cathode 18 toward the anode 17 in order to excite and ionize the gas molecules originating from the chamber 3. In order to obtain a usable plasma, added thereto is a magnetic field B 22 of constant intensity, around 100 mT, and of given direction, perpendicular to the electric field 21 and parallel to the axis 200. The magnetic field 21 is generated by at least one permanent toric magnet 23 surrounding the cylindrical enclosure 11. The presence of a magnetic field B 22 coupled to the electric field B 21 makes it possible to greatly increase the excitation of the plasma gas molecules. Thus, the plasma source is generated by the combined action of a constant electric field 21 between two electrodes 17, 18 having cylindrical geometry and of a constant magnetic field 22, parallel to the surface of the electrodes 17, 18 and orthogonal to the electric field 21.

The plasma generated over the gas species present in the enclosure 10 emits light that originates from the deexcitation of the characteristic molecules of the gases present.

The cylindrical chamber 10 comprises an optical window, such as a transparent porthole 24. The light that passes through the optical window is collected, for example, by an optical collector system and analyzed spectrally by the optical emission spectrometer (EOS) 9 optically connected via a fiber 12 which transports light from the optical collector to the spectrometer 9. The optical spectrometer 9 establishes the characteristic spectrum of the gas species present in the enclosure 10. The wavelengths of the lines of the optical spectrum thus obtained are characteristic of the gas species present in the chamber 3.

Such an ionized gas detector is for example described in patent application WO 2009/027156 in the name of the Applicant.

In operation, the detection method 100 for testing sealed products 2 for leaks carried out in the detection device 1 comprises the following steps (FIG. 5).

In a first step 101, at least one product 2 that has been sealed beforehand under an air, nitrogen or argon atmosphere is placed in the chamber 3. This first step 101 is carried out at the pressure of the atmosphere outside of the chamber 3, for example atmospheric pressure.

In a preliminary step of detecting major leaks 102, the evolution, in the chamber 3, of the concentration of at least one gas species is monitored.

For example, in the case of a product which has been sealed beforehand under an atmosphere other than air, such as under an argon or nitrogen atmosphere, the evolution, in the chamber 3, of the concentration of at least one gas species of the chamber 3, such as oxygen, is monitored.

In the presence of a major leak, the gas volume contained in the sealed product 2 migrates into the chamber 3, which lowers the concentration of the gas species of the air present in the chamber 3, such as oxygen. The reduction in the concentration of oxygen in the chamber 3 then indicates the presence of a major leak.

According to another example, the atmosphere of the chamber 3 containing the sealed product 2 is replaced by a purge gas, such as nitrogen or argon, and the evolution, in the chamber 3, of the concentration of at least one gas species of the gas volume contained in the sealed product 2, different from the purge gas, such as oxygen, is monitored.

The preliminary detection step makes it possible to prevent, in the event of major leaks, the lowering of the pressure to a high vacuum pressure from also giving rise to the pumping of all the gas contained in the cavity of the sealed product 2 through the major leak and therefore the non-detection of the major leak.

During the step of detecting major leaks 102, it is possible either to leave the pressure of the chamber 3 at the ambient atmospheric pressure, or to lower the pressure to a rough vacuum pressure, of greater than 1 mbar, in order to accelerate the diffusion of the gas mixture (gas contained in the sealed product and gas from the chamber 3) toward the gas sensor 25.

Then in a second detection step 103, if no major leak is detected, the pressure in the chamber 3 is lowered to a high vacuum pressure at least of less than $10^{-2}$ mbar, by placing the chamber 3 in communication with the pumping unit 4 maintained continually under vacuum.

When the pressure in the chamber reaches a high vacuum pressure, for example of less than $10^{-2}$ mbar, while continuing the high vacuum pumping in the chamber 3, the gases contained in the chamber 3 are ionized in order to monitor the evolution, in the chamber 3, of the concentration of at least one ionized gas species of the gas volume contained in the sealed product from among nitrogen, oxygen or argon, via analysis by optical emission spectrometry or mass spectrometry and the evolution of the concentration of the gas species is compared to calibrated evolutions of concentration of a reference gas species in order to identify the presence of a leak from the sealed product (step 103).

At low pressure and in the absence of leaks, the air which was present in the chamber 3 is evacuated and the residual atmosphere predominantly consists of water vapor resulting from the degassing of the walls. The gas contained in the sealed product 2 is therefore in principle absent from the atmosphere of the chamber 3, the latter predominantly containing water vapor.

The high vacuum detection step 103 and the preliminary step of detecting major leaks 102 use the fact that the sealed products 2 contain a gas atmosphere trapped between the element to be protected and the packaging. Monitoring the evolution of the gas species contained in this gas volume and the comparison thereof with calibrated changes of a reference gas species therefore makes it possible to identify the presence of a leak from the sealed product 2.

The analysis by optical emission spectrometry or mass spectrometry makes it possible to detect very small amounts of ionized gas species in real time, that is to say without a waiting time isolated from the pumping necessary for the accumulation of gas molecules to be monitored as may be the case in certain detection methods of the prior art. The time needed for the leak test is therefore reduced. This is made possible by placing under high vacuum, essential for distinguishing the ambient air and its constituents from the air contained in the sealed product 2.

During the high vacuum detection step 103 and the preliminary step of detecting major leaks 102, the gas species monitored may be a distinctive gas species of air such as nitrogen or oxygen. Indeed, many sealed products, like those from the pharmaceutical or agri-food industry, are sealed under air. Since air comprises around 78% nitrogen and 20% oxygen, these two gas species are readily identifiable in the chamber 3 in the event of a leak from the sealed product 2.

Certain products are sealed under a nitrogen atmosphere in order to prevent oxidation of the element to be protected, in particular in the food industry for a sterile closure, in particular of packaging sachets. Monitoring the evolution of the nitrogen concentration makes it possible, in this case, to indicate a leak from the sealed product.

Thus, in the event of the packaging leaking or bursting, air or nitrogen from the product may be easily and rapidly evacuated from the chamber 3, unlike helium from the tests of the prior art, which requires long minutes of pumping the chamber before it can be reused for a new leak test.

In addition, in the case where the gas species is monitored by optical emission spectrometry, the nitrogen present has the advantage of producing an optical spectrum which is easy to interpret. Moreover, a nitrogen plasma is easy to initiate.

In the pharmaceutical industry, certain biological materials are sealed under an atmosphere comprising an inert gas, such as argon in order to prevent the deterioration of these biological materials. This is the case in particular for DNA (deoxyribonucleic acid) which risks being deteriorated once extracted from living tissues, especially by water or oxygen. Sealing under argon may also be used in the food industry, especially for preserving meat.

Sealing under argon is also used in the motor vehicle field.

Certain products may be sealed under a gas mixture, especially a mixture of argon and nitrogen, for example for fire extinguisher tanks.

The gas species to be monitored may therefore be argon.

Helium is not a gas species used as indicator of a leak from the sealed product due to the small proportion of helium in the air and therefore the tiny proportion of helium that could escape from a sealed product containing air. Also, due to its difficulty in being evacuated, helium may have a high background noise relative to the concentrations whose evolution it would be desired to monitor.

According to a first exemplary embodiment, the pressure in the chamber 3 is lowered to a vacuum pressure limit, that is to say that the pumping is maximum and that no gas is introduced into the chamber 3 and the pumping line comprising the line 5 and the pumping unit 4. The measurement is thus particularly sensitive since the gas which could originate from the gas volume contained in a defective sealed product 2 is not diluted very much.

Figure 6A:
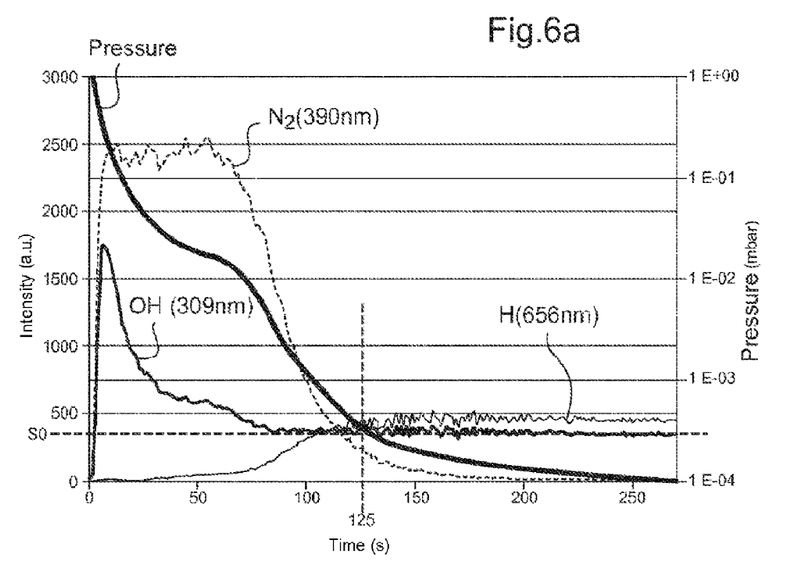
FIG. 6a is a graph of the evolution (in seconds on the x-axis) of the pressure (in mbar on the right-hand y-axis) of a detection device chamber containing an intact sealed product and of the evolution of the intensities of the distinctive spectral lines (in arbitrary units on the left-hand y-axis) of nitrogen and of water vapor.
Figure 6B:
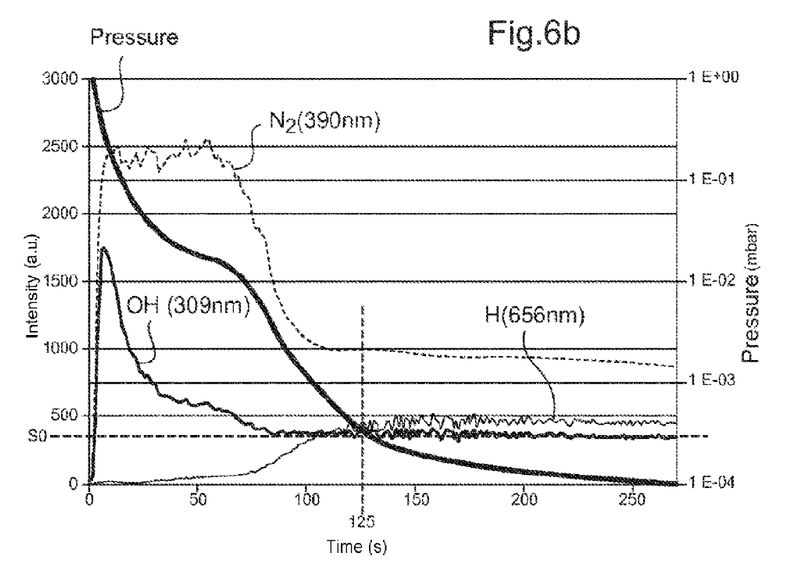
FIG. 6b is a graph similar to FIG. 6a for the chamber containing a sealed product, the packaging of which is defective.

The graphs represented in FIGS. 6a and 6b show an example of a leak test for packagings of sealed products by monitoring the evolution of the concentration of a gas species in the chamber 3, which is present in the air of a sealed product via measurement by optical emission spectroscopy.

The graph from FIG. 6a represents the evolution of the drop in vacuum pressure limit in a chamber 3 containing an intact sealed product 2.

In this example, the gas species monitored is nitrogen. For example, a spectral line of nitrogen at 390 nm is monitored.

On this figure it is observed that after around 200 seconds of pumping, the nitrogen which was present in the chamber 3 is completely evacuated, the intensity of the distinctive nitrogen line monitored then being virtually zero, that is to say of the order of the intensity of the background noise. The residual atmosphere then predominantly consists of water vapor resulting from the degassing of the walls.

Also represented on this graph is the evolution of the spectral lines of hydrogen at 656 nm and of the molecule OH at 309 nm as distinctive lines of water vapor. The distinctive spectral lines of water vapor are those of the gas species consisting of one or more hydrogen atoms such as $H_2$ or H, consisting of one or more oxygen atoms such as $O_2$ (oxygen possibly being a product generated in a water vapor plasma) and consisting of one or more atoms of hydrogen and oxygen, such as $H_2O$ or OH.

The intensities of the distinctive spectral lines of hydrogen and of OH after pumping remain high, which indicates that the residual atmosphere predominantly consists of water vapor.

Air is therefore absent from the atmosphere of the chamber 3 so that the time-related monitoring of the gas species monitored, of the gas species of air in this example, and the comparison thereof with a calibrated evolution, makes it possible to indicate the presence of a leak from the sealed product 2.

In the example illustrated in FIG. 6a, the predetermined threshold S0 is for example 200 arbitrary units of intensity of the distinctive spectral line of nitrogen at 390 nm after 125 seconds under vacuum or at a pressure in the chamber 3 of $3 \times 10^{-4}$ mbar.

In FIG. 6b that represents the evolution of the drop in vacuum pressure limit in the chamber 3 containing a defective sealed product, it is observed that the intensity of the distinctive spectral line of the nitrogen line is greater than this predetermined threshold S0, which expresses the presence of a leak from the product.

According to this example, the evolution of the gas species monitored, such as nitrogen, is therefore compared to the calibrated evolution of this gas species, here nitrogen, in the absence of a leak (FIG. 6a) that serves as a reference.

According to one example of implementation via measurement by optical emission spectrometry, the evolution of the ratio of the intensities of a spectral line of the gas species monitored, for example a distinctive spectral line of air, and of a distinctive spectral line of water vapor from the chamber 3 is monitored. Of course, the line ratio may be carried out with a species other than water vapor.

Indeed, the atmosphere of the chamber 3 very often comprises water vapor: at high pressure, the chamber 3 contains water vapor originating from moisture from the air that entered with the sealed product 2 and, at low pressure, the chamber 3 contains water vapor originating from the degassing of the walls. The spectrum of the gas species present in the chamber 3 therefore often contains a distinctive water vapor line, such as the distinctive spectral line of H or of OH. Thus, should the optical window of the enclosure 10 of the ionized gas detector 7 capture less light, for example due to the fouling thereof, making the signal transmitted to the treatment unit 8 lose intensity, it is ensured that the measurement given by the ratio of the lines remains valid and representative of the evolution of the partial pressure of air. Moreover, monitoring the ratio of the intensities of a distinctive spectral line of air to a distinctive spectral line of water vapor makes it possible to standardize the intensity of the distinctive spectral line of air in order to ensure that the evolution thereof is indeed representative of the partial pressure of air.

In this case, the evolution of the gas species monitored, such as nitrogen, is therefore compared to calibrated evolutions of the ratio of the spectral line of this gas species, here nitrogen to a distinctive water vapor line, in the absence of a leak or according to the leakage rate.

In a fourth step 104, the ratio of the intensities of the spectral line of the gas species monitored, for example of the distinctive spectral line of air, and of a distinctive spectral line of water vapor is compared with calibration curves stored in the memory of the treatment unit 8, in order to quantify the leak.

Figure 7:
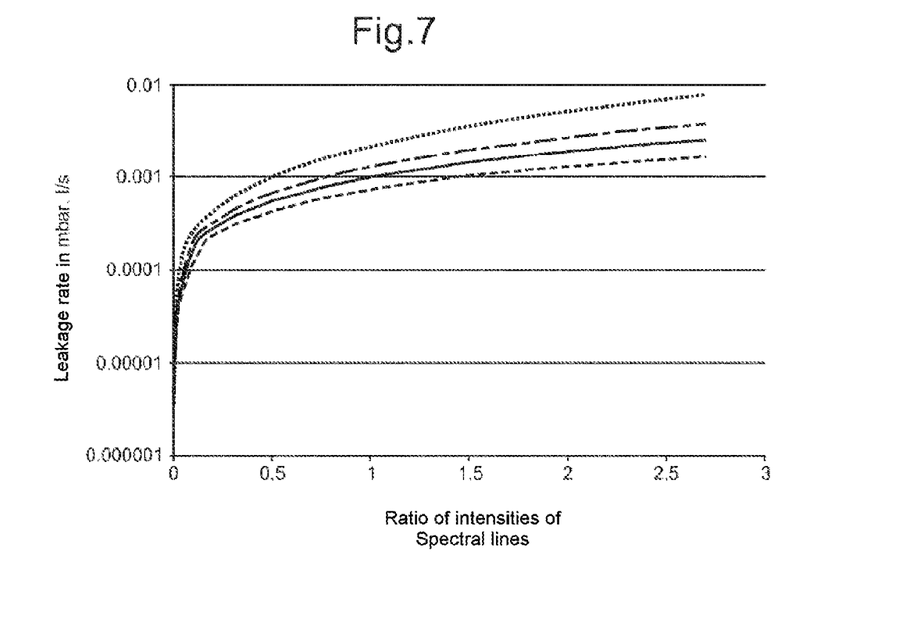
FIG. 7 is a graph of an example of calibration curves for the ionized gas detector obtained for several pressures in the detection device chamber and for several calibrated leaks.

The calibration curves are produced with the same conditions as the detection method 100. They provide the correspondence between the ratios of the intensities of the spectral line of the gas species monitored, for example a distinctive spectral line of air and of a distinctive spectral line of water vapor for various leaks calibrated at various pressures in the chamber 3 of the detection device 1. The calibration curves thus make it possible to make the signals obtained by the ionized gas detector 7 correspond to quantified leakage values in mbar·l/s.

FIG. 7 thus illustrates an example of calibration curves of an ionized gas detector.

The calibration curves also give an indication of the drop in pressure in the chamber 3 over time. The degassing rate of the walls of the chamber 3 depend on the vacuum pressure limit in the chamber 3. The degassing and the pressure decrease over time and consequently the proportion of water vapor in the chamber 3 also decreases, increasing the detection sensitivity of the ionized gas detector 7.

Thus, from the pressure in the chamber 3 or from the duration under vacuum of the sealed product 2, and from the ratio of the intensities of the distinctive spectral lines, the calibration curves correspond to a quantified leakage value which is independent of the degassing rate of the air of the walls of the chamber 3.

Figure 8:
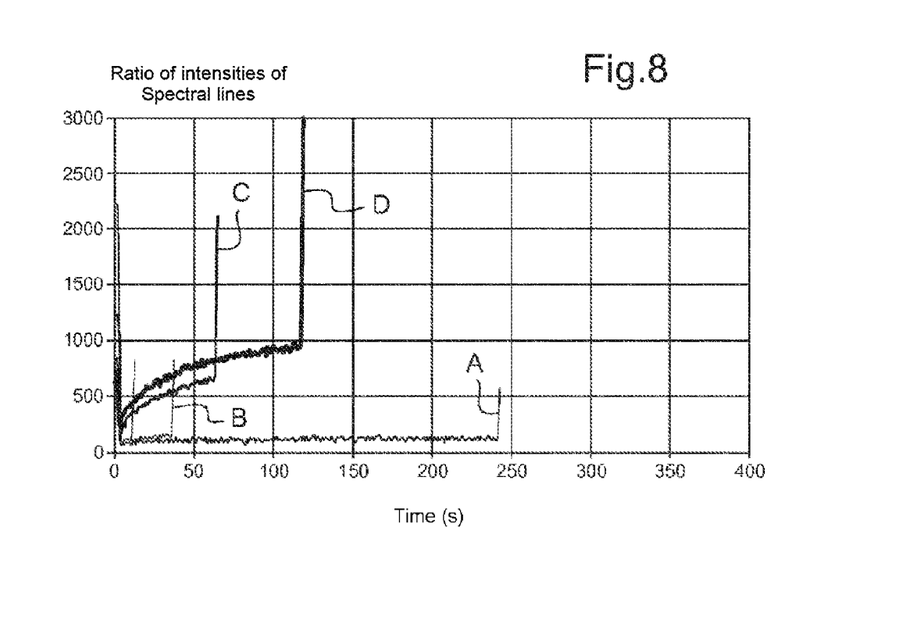
FIG. 8 is a graph of the monitoring of the ratio of the intensities of a distinctive spectral line of nitrogen to a distinctive spectral line of hydrogen, as a function of the time (in seconds) in the chamber without a sealed product (curve A), containing an intact sealed product (curve B) and containing two sealed products, the packagings of which are defective (curves C and D).

Various examples of leak tests for packagings of sealed products are represented in the graph from FIG. 8.

In these examples, the evolution of the ratio of the intensities of a distinctive spectral line of nitrogen at 390 nm and of a distinctive spectral line of hydrogen at 656 nm is monitored.

In a preliminary test, the pressure in the chamber 3 is lowered to a vacuum pressure limit of the order of $5 \times 10^{-5}$ mbar and the level of the background noise in the chamber 3 is measured (curve A). At low pressure, the nitrogen which was present in the chamber 3 has been evacuated and the residual atmosphere of the chamber 3 then predominantly consists of water vapor resulting from the degassing of the walls of the chamber 3. The ratio of the intensities of the nitrogen and hydrogen lines is virtually zero since the distinctive spectral line of nitrogen is not present in the spectrum.

Next, a sealed product 2 which does not have leaks is placed in the chamber 3 and the pressure in the chamber 3 is lowered to a vacuum pressure limit (curve B). The ratio of the intensities of the nitrogen and hydrogen lines increases slightly due to the degassing of nitrogen from the walls of the sealed product 2. This ratio therefore represents the background noise.

Next, two defective sealed products 2 are tested.

The time-related increase in the ratio of the intensities is the indicator that the sealed products C and D have a leak. The air present in the sealed product 2 migrates into the chamber 3 so that the concentration of the gas species of the air becomes greater than the gas concentration of the air in the chamber 3 in the absence of leaks.

In the graph from FIG. 8, it is also observed that the leak from the sealed product D is greater than that from the sealed product C. Indeed, the more quickly the ratio of the intensities of the lines increases, the greater the leak.

It is also observed that the signal of the ratio of the intensities is not constant over time. Indeed, as the pressure drops, the degassing of the walls of the chamber 3 decreases. The comparison of the evolution of the ratio of the intensities of the distinctive spectral line of nitrogen to the distinctive spectral line of hydrogen, with calibration curves of ratio of intensities of leaks calibrated at various pressures carried out in chamber 3 of the detection device 1 makes it possible to deduce the effect of the degassing of the walls of the chamber 3 in the quantification of the leakage rate.

Thus, the leakage rate of the second sealed product (curve C) has a leakage rate of the order of $5.2 \times 10^{-5}$ mbar·l/s and the leakage rate of the third sealed product (curve D) has a greater leakage rate of the order of $10^{-4}$ mbar·l/s.

The detection method 100 may therefore be carried out for testing the leaktightness of various types of sealed products, especially dry or liquid, transparent or non-transparent, flexible or rigid products, as long as they contain a gas volume.

It is not therefore necessary to pierce and replug the packaging in order to fill the sealed product with tracer gas, nor to seal the product with a tracer gas as in certain methods from the prior art. No particular step is necessary between the sealing of the product in production, the leak test and the marketing of the leak-free sealed product.

The detection method 100 is therefore non-destructive since it does not damage the packaging nor its contents, the sealed product 2 being able to be replaced directly, that is to say without specific cleaning or other treatment, in the packaging line. Furthermore, the detection method 100 has a good measurement sensitivity.

The invention claimed is:

1. A detection method for testing the leaktightness of sealed products, characterized in that it comprises the following steps:

placing in a chamber at least one product that has been previously sealed in an air, nitrogen or argon atmosphere, lowering the pressure in the chamber to a high vacuum pressure of less than $10^{-1}$ mbar and, while continuing the high vacuum pumping in the chamber, ionizing the gases contained in the chamber, and monitoring the evolution, in the chamber, of the concentration of ionized nitrogen gas of the gas volume contained in the sealed product, said ionizing and monitoring steps using an ionized gas detector comprising an enclosure capable of being placed in communication with the chamber, an optical emission spectrometer connected to an optical window of the enclosure, and a plasma-generating device arranged around the enclosure, capable of generating a plasma on the gas species present in the enclosure, wherein said monitoring step comprises monitoring the evolution of the ratio of the intensities of a distinctive spectral line of nitrogen to a distinctive spectral line of water vapor, in the spectrum representative of the gas species present in the chamber; and wherein said monitoring step further comprises comparing said ratio with the intensity ratios obtained for a plurality of leaks calibrated in the course of a drop in pressure in the chamber, in order to quantify the leak.

2. The detection method as claimed in claim 1, characterized in that before lowering the pressure in the chamber to a high vacuum pressure, the detection method comprises a preliminary step of detecting major leaks wherein the evolution, in the chamber, of the concentration of at least one gas species is monitored.

3. The detection method as claimed in claim 2, characterized in that in the step of detecting major leaks, the oxygen concentration is monitored.

4. The detection method as claimed in claim 2, characterized in that in the step of detecting major leaks, the pressure in the chamber is lowered to a rough vacuum pressure, of greater than 1 mbar.

5. The detection method as claimed in claim 2, characterized in that, in the step of detecting major leaks, the atmosphere of the chamber containing the sealed product is replaced by a purge gas and the evolution, in the chamber, of the concentration of at least one gas species of the gas volume contained in the sealed product, different from the purge gas, is monitored.

6. The detection method as claimed in claim 1, characterized in that the pressure in the chamber is lowered to a high vacuum pressure at least of less than $10^{-2}$ mbar.

7. The detection method as claimed in claim 1, wherein the sealed product is sealed in a packaging, and the product has been previously sealed in an air, nitrogen or argon atmosphere without filling the packaging with tracer gas.

8. The detection method as claimed in claim 1, wherein said product is a dry product.

9. The detection method as claimed in claim 1, wherein said product has been sealed in a package and said water vapor originates substantially from outside of the package.

10. A detection device for testing the leaktightness of sealed products, comprising:
    a chamber configured in order to receive at least one product which has been sealed under an air, nitrogen or argon atmosphere,
    a pumping unit comprising a rough vacuum pump and a turbomolecular vacuum pump connected in series, the inlet of the turbomolecular vacuum pump being connected to the outlet of the chamber,
    an ionized gas detector comprising a gas ionizer, connected to the chamber, the ionized gas detector comprising:
    an enclosure capable of being placed in communication with the chamber,
    an optical emission spectrometer connected to an optical window of the enclosure, and
    a plasma-generating device arranged around the enclosure, forming said gas ionizer of the ionized gas detector, capable of generating a plasma on the gas species present in the enclosure,
    a treatment unit connected to the ionized gas detector in order to receive signals representative of the evolution of gas species,
    characterized in that the treatment unit is configured to monitor the evolution, in the chamber, of the concentration of ionized nitrogen gas of the gas volume contained in the sealed product, and to compare the evolution of the concentration of said ionized gas to calibrated evolutions of reference gas species concentration in order to identify the presence of a leak from said sealed product,
    wherein said treatment unit monitors said evolution by monitoring a ratio of the intensities of a distinctive spectral line of nitrogen to a distinctive spectral line of water vapor, in the spectrum representative of the gas species present in the chamber, and
    wherein said treatment unit compares said evolution by comparing the monitored intensity ratio with the intensity ratios obtained for a plurality of leaks calibrated in the course of a drop in pressure in the chamber, in order to quantify the leak.

11. The detection device as claimed in claim 10, wherein said product is a dry product.

12. The detection device as claimed in claim 10, wherein said product has been sealed in a package and said water vapor originates substantially from outside of the package.

* * * * *